United States Patent
Jo (10) Patent No.: US 11,292,503 B2
(45) Date of Patent: Apr. 5, 2022

(54) VEHICLE STEERING SYSTEM AND CONTROL METHOD THEREOF

(71) Applicants: HYUNDAI MOTOR COMPANY, Seoul (KR); KIA MOTORS CORPORATION, Seoul (KR)

(72) Inventor: Ho Ssang Jo, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 12 days.

(21) Appl. No.: 16/747,303

(22) Filed: Jan. 20, 2020

(65) Prior Publication Data
US 2021/0122405 A1 Apr. 29, 2021

(30) Foreign Application Priority Data
Oct. 28, 2019 (KR) ........................ 10-2019-0134816

(51) Int. Cl.
| | |
|---|---|
| B62D 1/183 | (2006.01) |
| B62D 1/06 | (2006.01) |
| B62D 1/08 | (2006.01) |
| G05D 1/00 | (2006.01) |
| B62D 1/187 | (2006.01) |
| B62D 1/185 | (2006.01) |
| B60W 60/00 | (2020.01) |
| F16H 19/04 | (2006.01) |
| B60N 2/06 | (2006.01) |
| B60W 50/14 | (2020.01) |

(52) U.S. Cl.
CPC ........... *B62D 1/183* (2013.01); *B60W 60/005* (2020.02); *B62D 1/06* (2013.01); *B62D 1/08* (2013.01); *B62D 1/185* (2013.01); *B62D 1/187* (2013.01); *G05D 1/0088* (2013.01); *B60N 2/06* (2013.01); *B60W 50/14* (2013.01); *F16H 19/04* (2013.01)

(58) Field of Classification Search
CPC .......... B62D 1/183; B62D 1/185; B62D 1/06; B62D 1/08; B62D 1/187; G05D 1/0088; B60W 60/005; B60W 50/14; F16H 19/04; B60N 2/06
USPC ............................................. 701/23
See application file for complete search history.

(56) References Cited

U.S. PATENT DOCUMENTS

| | | | |
|---|---|---|---|
| 2004/0025624 A1* | 2/2004 | Kreuzer | .................. B60Q 9/00 74/552 |
| 2011/0226088 A1* | 9/2011 | Muller | .................... B62D 1/08 74/552 |

(Continued)

FOREIGN PATENT DOCUMENTS

| | | |
|---|---|---|
| JP | H11240365 A | 9/1999 |
| JP | 2018092336 A | 6/2018 |

(Continued)

*Primary Examiner* — Jonathan M Dager
*Assistant Examiner* — Jean W Charleston
(74) *Attorney, Agent, or Firm* — Lempia Summerfield Katz LLC (57) ABSTRACT

A steering system for a vehicle includes a hub connected to a steering column of the vehicle, a spoke connected to the hub, a rim disposed around the hub and connected to the spoke so as to be rectilinearly movable, a first gear provided in the spoke and rotated by a power source, and a second gear that is provided on the rim so as to be engaged with the first gear and rectilinearly moved by the rotation of the first gear and that moves the rim relative to the spoke.

19 Claims, 7 Drawing Sheets

(56) References Cited

U.S. PATENT DOCUMENTS

| | | | |
|---|---|---|---|
| 2013/0127610 A1* | 5/2013 | Sanma | B60Q 9/00 |
| | | | 340/438 |
| 2014/0049094 A1* | 2/2014 | Cho | B60L 50/16 |
| | | | 301/6.5 |
| 2017/0297606 A1 | 10/2017 | Kim | |
| 2018/0029501 A1* | 2/2018 | Wolf | B60W 50/14 |
| 2018/0037248 A1* | 2/2018 | Schwarz | B60W 60/0051 |
| 2018/0127610 A1* | 5/2018 | Kido | C09D 11/38 |
| 2018/0334183 A1 | 11/2018 | Beauregard | |

FOREIGN PATENT DOCUMENTS

| | | |
|---|---|---|
| KR | 101856524 B1 | 5/2018 |
| WO | 2019034553 A1 | 2/2019 |

\* cited by examiner

VEHICLE STEERING SYSTEM AND CONTROL METHOD THEREOF

CROSS-REFERENCE TO RELATED APPLICATION

This application claims the benefit of priority to Korean Patent Application No. 10-2019-0134816, filed in the Korean Intellectual Property Office on Oct. 28, 2019, the entire contents of which are incorporated herein by reference.

TECHNICAL FIELD

The present disclosure relates to a vehicle steering system and a control method thereof. More particularly, the present disclosure relates to a vehicle steering system for moving a rim depending on an operating mode of a vehicle for improving convenience and safety, and a method for controlling the vehicle steering system.

BACKGROUND

In recent years, with the development of the automotive industry, autonomous driving systems and driving assistance systems for providing driver convenience have been consistently developed.

The autonomous driving systems are technologies for allowing a vehicle to travel autonomously without direction or intervention by a driver. The autonomous driving systems may recognize surrounding vehicles, i.e., nearby, in the vicinity of the vehicle, or the like, and obstacles through sensors and may provide various convenient functions, such as lane keeping, speed keeping, forward vehicle tracking, lane change, and the like.

However, in the related art, a steering wheel for controlling the direction of a vehicle is configured to always maintain a predetermined posture (e.g., a predetermined position and angle) irrespective of an operating mode (e.g., a manual driving mode or an autonomous driving mode) of the vehicle. Therefore, driver convenience is deteriorated, and it is difficult to create a comfortable riding environment.

In particular, unlike in a manual driving mode in which a driver directly operates a steering wheel, in an autonomous driving mode, the steering wheel has to be able to be disposed in a posture capable of minimization of contact and interference between the driver and the steering wheel (e.g., the steering wheel has to be able to be maximally moved upward). However, in the related art, the steering wheel is configured to always maintain the predetermined posture irrespective of an operating mode of the vehicle. Therefore, driver convenience is deteriorated, and it is difficult to create a comfortable riding environment.

Accordingly, in recent years, various studies have been conducted to automatically optimize the posture of a steering wheel depending on an operating mode of a vehicle. However, there is still a need for further development.

SUMMARY

The present disclosure has been made to solve the above-mentioned problems occurring in the prior art while advantages achieved by the prior art are maintained intact.

An aspect of the present disclosure provides a vehicle steering system for improving convenience and safety and a control method thereof.

In particular, another aspect of the present disclosure provides a vehicle steering system for optimizing the posture of a rim depending on an operating mode of a vehicle, and a method for controlling the vehicle steering system.

Another aspect of the present disclosure provides a vehicle steering system for creating a comfortable riding environment and improving driver satisfaction and a control method thereof.

The technical problems to be solved by the present disclosure are not limited to the aforementioned problems. Any other technical problems not mentioned herein should be clearly understood from the following description by those of ordinary skill in the art to which the present disclosure pertains.

According to an aspect of the present disclosure, a steering system for a vehicle includes: a hub connected to a steering column of the vehicle; a spoke connected to the hub; a rim disposed around the hub and connected to the spoke so as to be rectilinearly movable; a first gear provided in the spoke and rotated by a power source; and a second gear that is provided on the rim so as to be engaged with the first gear and rectilinearly moved by the rotation of the first gear and that moves the rim relative to the spoke.

The aim is to optimize the posture of the rim depending on an operating mode of the vehicle and improve convenience and safety.

In other words, in the related art, a steering wheel for controlling the direction of a vehicle is configured to always maintain a predetermined posture (e.g., a predetermined position and angle) irrespective of an operating mode (e.g., a manual driving mode or an autonomous driving mode) of the vehicle. Therefore, driver convenience is deteriorated, and it is difficult to create a comfortable riding environment.

However, the present disclosure may change the posture (position and angle) of the rim depending on an operating mode of the vehicle, thereby achieving advantageous effects of expanding the space for the driver's seat, improving driver convenience, and creating a comfortable riding environment.

The structure for a rectilinear movement between the rim and the spoke may be variously modified depending on required conditions and design specifications. For example, a guide member may be connected to the spoke, and the rim may be received in the guide member so as to be rectilinearly movable.

A guide protrusion may be formed on the rim, and the guide member may have a guide groove formed therein. The guide protrusion is received in the guide groove so as to be rectilinearly movable. The rim may rectilinearly move relative to the spoke (the guide member) in the state in which the guide protrusion is received in the guide groove. Accordingly, advantageous effects may be obtained in which the rectilinear movement of the rim is stably supported and a shake of the rim is minimized.

According to an embodiment of the present disclosure, the steering system for the vehicle may further include a processor that controls a position of the rim relative to the hub, based on an operating mode of the vehicle.

More specifically, the operating mode of the vehicle in the present disclosure may be any one of a boarding/alighting mode, an autonomous driving mode, an autonomous driving entertainment mode, and a manual driving mode. The processor may control the first gear to move the rim to the uppermost position or the lowermost position relative to the hub, based on any one of the autonomous driving mode, the boarding/alighting mode, the autonomous driving entertainment mode, and the manual driving mode.

According to an embodiment of the present disclosure, the steering system for the vehicle may further include a tilt and telescopic device that tilts the hub and telescopically moves the hub. The processor may control the tilt and telescopic device, based on the operating mode of the vehicle.

For example, the processor may move the rim to the uppermost position relative to the hub, may tilt the hub upward, and may telescopically move the hub forward, when the boarding/alighting mode of the vehicle or the autonomous driving mode of the vehicle is activated.

When the boarding/alighting mode of the vehicle or the autonomous driving mode of the vehicle is activated, the hub may be tilted upward and telescopically moved forward. Accordingly, interference with the steering wheel (e.g., interference with the steering wheel when a driver sits with his/her legs crossed) may be minimized. Advantageous effects may be obtained in which the space for the driver's seat is expanded and a comfortable riding environment is created.

In another example, the processor may move the rim to the lowermost position relative to the hub, may tilt the hub downward, and may telescopically move the hub forward, when the autonomous driving entertainment mode of the vehicle is activated.

When the autonomous driving entertainment mode of the vehicle is activated, the hub may be tilted downward and may be telescopically moved forward. Accordingly, advantageous effects may be obtained in which a display device is minimally hidden by the rim and a comfortable video viewing environment is created.

According to an embodiment of the present disclosure, the steering system for the vehicle may further include a seat moving device that moves a seat of the vehicle forward or backward. The processor may move the seat backward, when the autonomous driving entertainment mode of the vehicle is activated.

When the autonomous driving entertainment mode of the vehicle is activated, the hub may be tilted downward and telescopically moved forward, and the seat may be moved backward. Accordingly, an advantageous effect may be obtained in which a more comfortable video viewing environment is created.

In another example, the processor may move the rim to a predetermined initial position relative to the hub, when the manual driving mode of the vehicle is activated.

According to an embodiment of the present disclosure, the steering system for the vehicle may further include an audio guidance device that provides an audio guidance message for the operating mode of the vehicle before the control of the position of the rim relative to the hub.

According to another aspect of the present disclosure, a method is provided for controlling a steering system for a vehicle. The vehicle includes: a hub connected to a steering column of the vehicle; a spoke connected to the hub; a rim disposed around the hub and connected to the spoke so as to be rectilinearly movable; a first gear provided in the spoke and rotated by a power source; and a second gear that is provided on the rim so as to be engaged with the first gear and rectilinearly moved by the rotation of the first gear and that moves the rim relative to the spoke. The method includes a detection step of detecting an operating mode of the vehicle and a control step of controlling a position of the rim relative to the hub, based on the operating mode of the vehicle.

More specifically, in the detection step, any one of an autonomous driving mode, a boarding/alighting mode, an autonomous driving entertainment mode, and a manual driving mode may be detected. In the control step, the first gear may be controlled to move the rim to the uppermost position or the lowermost position relative to the hub, based on any one of the autonomous driving mode, the boarding/alighting mode, the autonomous driving entertainment mode, and the manual driving mode.

According to an embodiment of the present disclosure, the method may further include a moving step of tilting the hub and telescopically moving the hub, based on the operating mode of the vehicle.

For example, in the control step, the rim may be moved to the uppermost position relative to the hub, and the hub may be tilted upward and telescopically moved forward, when the autonomous driving mode of the vehicle or the boarding/alighting mode of the vehicle is activated.

In another example, in the control step, the rim may be moved to the lowermost position relative to the hub and the hub may be tilted downward and telescopically moved forward, when the autonomous driving entertainment mode of the vehicle is activated. Furthermore, in the control step, a seat of the vehicle may be moved backward when the autonomous driving entertainment mode of the vehicle is activated.

According to an embodiment of the present disclosure, in the control step, the rim may be moved to a predetermined initial position relative to the hub when the manual driving mode of the vehicle is activated.

According to an embodiment of the present disclosure, the method may further include an audio guidance step of providing an audio guidance message for the operating mode of the vehicle before the control of the position of the rim relative to the hub.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Hereinafter, several embodiments of the present disclosure are described in detail with reference to the accompanying drawings. However, the present disclosure is not restricted or limited by the embodiments. For reference, the same reference numerals in this specification denote substantially the same components, components illustrated in different drawings may be described under the above rule, and descriptions that are well known to those of ordinary skill in the art or redundant are omitted.

Figure 1:
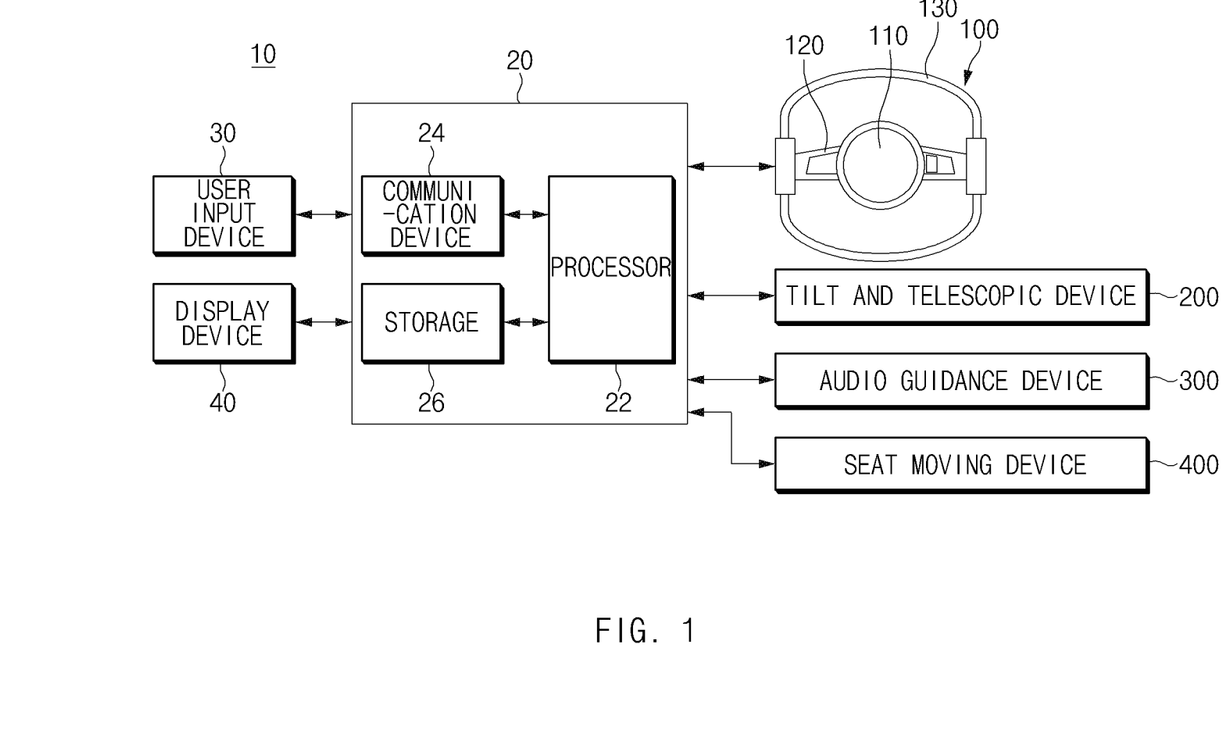
FIG. 1 is a view illustrating a steering system for a vehicle according to an embodiment of the present disclosure.
Figure 2:
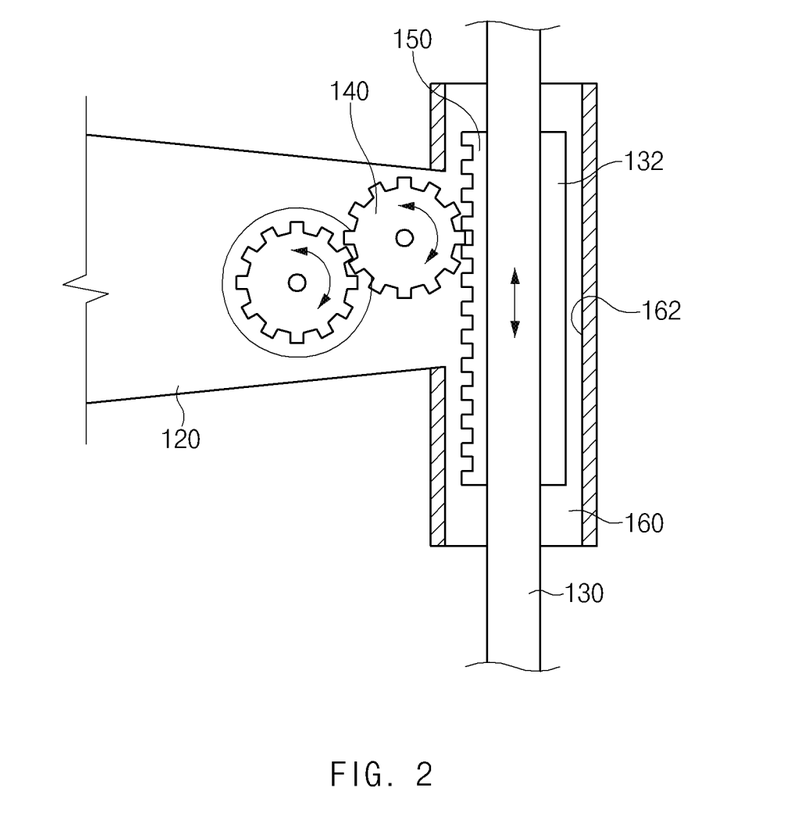
FIGS. 2 and 3 are views illustrating a first gear and a second gear as the steering system for the vehicle according to an embodiment of the present disclosure.
Figure 3:
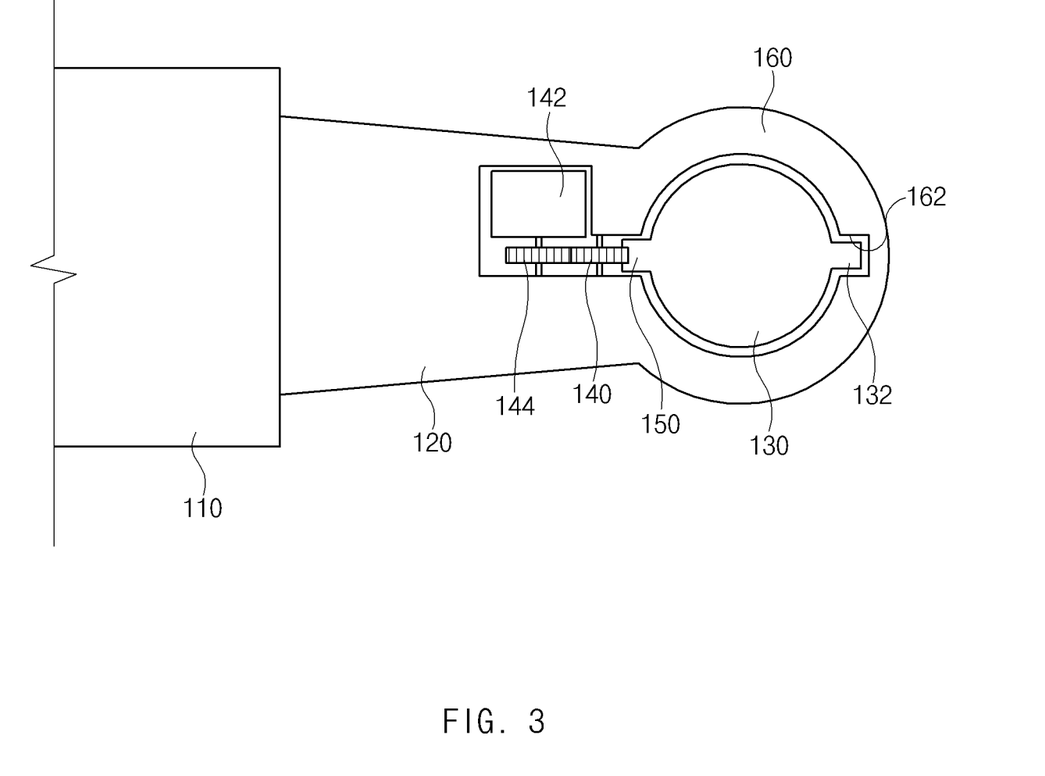
Figure 4:
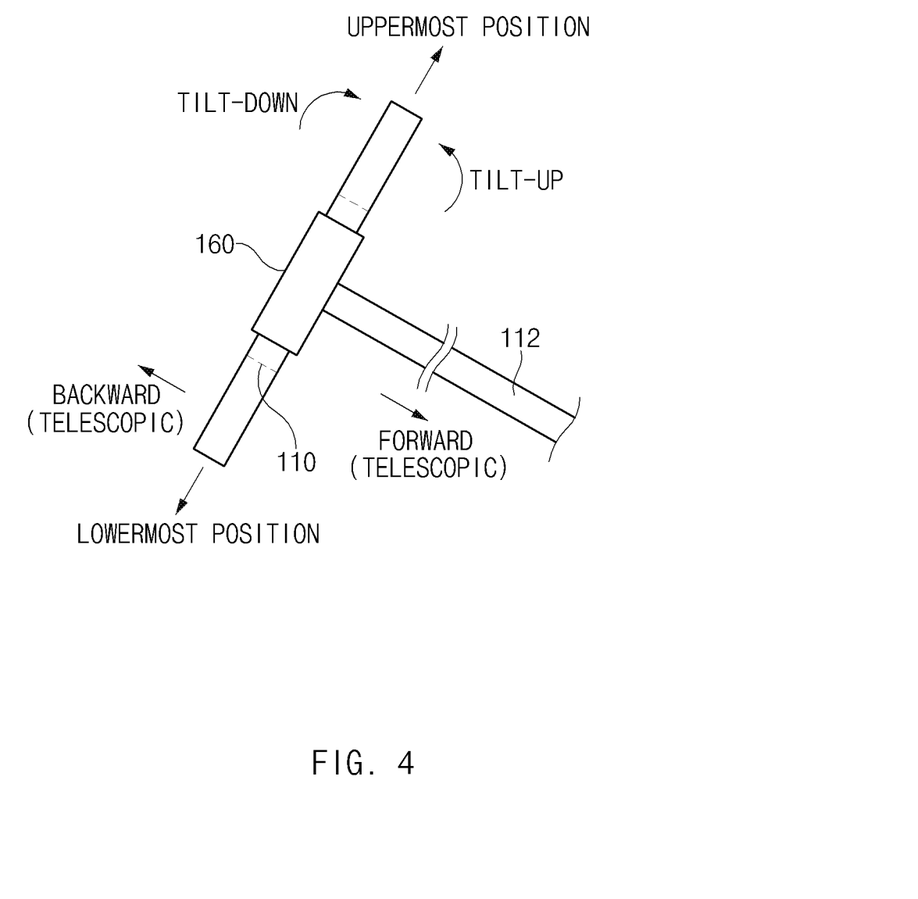
FIGS. 4-6 are views illustrating a movement of a rim as the steering system for the vehicle according to embodiments of the present disclosure.
Figure 5:
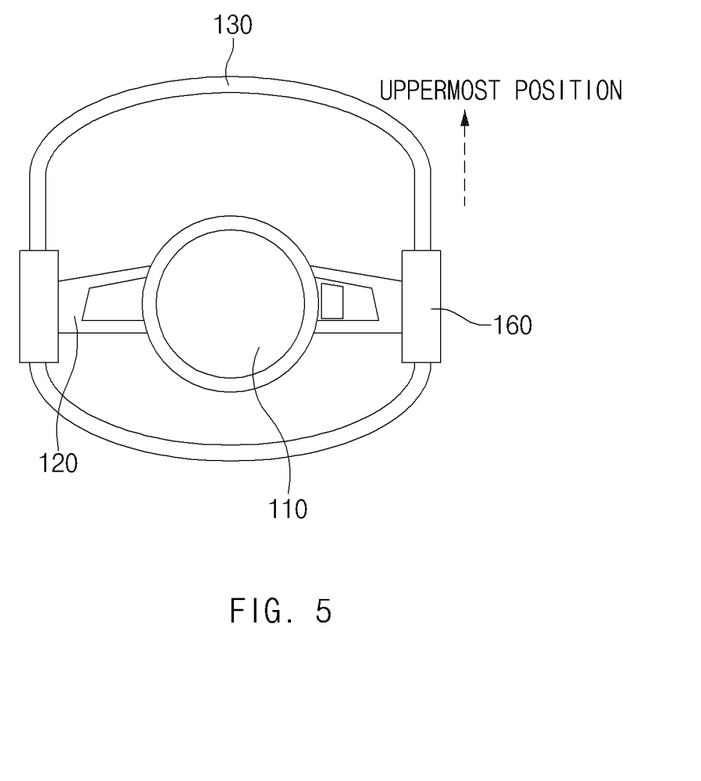
Figure 6:
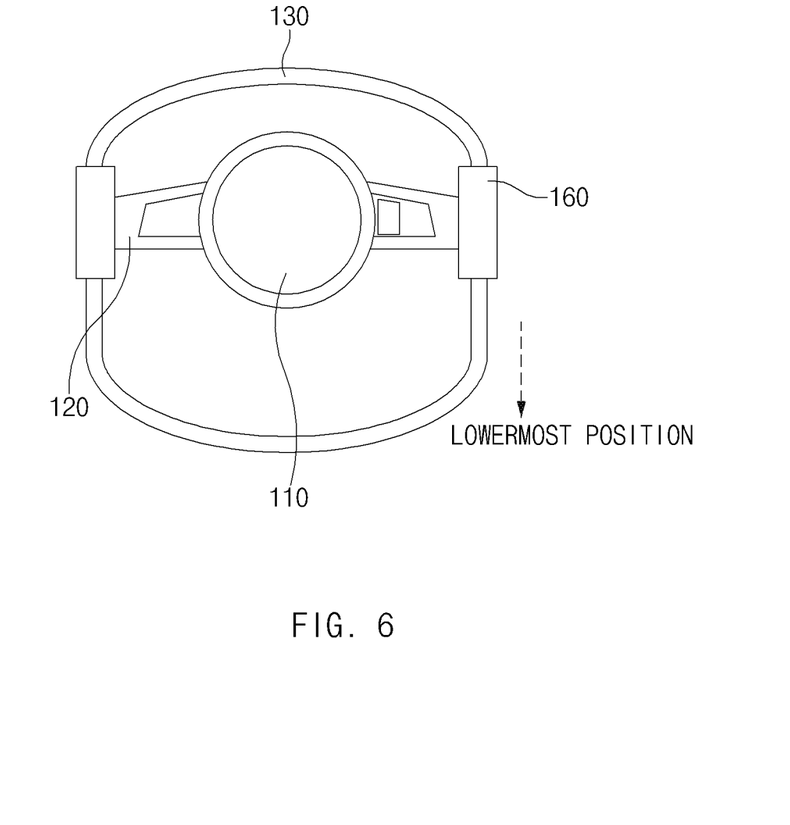

FIG. 1 is a view illustrating a steering system 10 for a vehicle according to the present disclosure. FIGS. 2 and 3 are views illustrating a first gear 140 and a second gear 150 as the steering system 10 for the vehicle according to an embodiment of the present disclosure. FIGS. 4-6 are views illustrating a movement of a rim 130 as the steering system 10 for the vehicle according to embodiments the present disclosure.

Referring to FIGS. 1-6, the steering system 10 for the vehicle according to the present disclosure includes: a hub 110 connected to a steering column 112 of the vehicle; a spoke 120 connected to the hub 110; the rim 130 disposed around the hub 110 and connected to the spoke 120 so as to be rectilinearly movable; the first gear 140 provided in the spoke 120 and rotated by a power source 142; and the second gear 150 that is provided on the rim 130 so as to be engaged with the first gear 140 and rectilinearly moved by the rotation of the first gear 140 and that moves the rim 130 relative to the spoke 120.

For reference, the hub 10, the spoke 120, and the rim 130 constitute a steering wheel 100. An operating force applied to the steering wheel 100 by a driver is transmitted through the steering column 112 and an operating mechanism (not illustrated), including a rack and a pinion, to change the direction of vehicle wheels (not illustrated) that have a suspension device attached thereto, thereby changing the direction of the vehicle depending on the driver's intent.

The hub 110 is connected to the steering column 112, and the spoke 120 is connected to the periphery of the hub 110. For example, the hub 110 may be formed in a circular shape, and two spokes 120 may be connected to the periphery of the hub 110 so as to be spaced apart from each other.

The structure of the hub 110 and the number of spokes 120 may be variously modified depending on required conditions and design specifications. The present disclosure is not limited or restricted by the structure of the hub 110 and the number of spokes 120.

The rim 130 is provided such that the driver is able to grip the rim 130 with a hand. The rim 130 is connected to the hub 110 by the spoke 120 so as to be disposed around the hub 110 and is connected to be rectilinearly movable relative to the spoke 120.

In this example, the rectilinear movement of the rim 130 relative to the spoke 120 is defined as a rectilinear movement of the rim 130 relative to the spoke 120 along an up/down direction with respect to FIG. 1.

For example, the rim 130 may be formed in a closed-loop structure that entirely surrounds the periphery of the hub 110. More specifically, with respect to FIG. 1, a left end portion and a right end portion of the rim 130 may be formed in the form of a straight line. An upper end portion and a lower end portion of the rim 130 may be formed in the form of a curve. The left end portion, the upper end portion, the right end portion, and the lower end portion of the rim 130 may form a continuously connected closed-loop structure.

According to another embodiment of the present disclosure, the rim 130 may be formed in an open-loop structure, or may be formed in any other structure. The present disclosure is not limited or restricted by the shape and structure of the rim 130.

The structure for the rectilinear movement between the rim 130 and the spoke 120 may be variously modified depending on required conditions and design specifications.

For example, a guide member 160 partially surrounding the periphery of the rim 130 may be connected to an end portion of the spoke 120. The rim 130 may be received in the guide member 160 so as to be rectilinearly movable.

The guide member 160 is formed to partially receive the left end portion or the right end portion of the rim 130 that has the form of a straight line (with respect to FIG. 1).

A guide protrusion 132 is formed on the outer circumferential surface of the rim 130 along the direction (the up/down direction with respect to FIG. 1) in which the rim 130 rectilinearly moves relative to the spoke 120. A guide groove 162 in which the guide protrusion 132 is received so as to be rectilinearly movable is formed on the inner surface of the guide member 160.

As described above, the rim 130 rectilinearly moves relative to the spoke 120 (the guide member 160) in the state in which the guide protrusion 132 is received in the guide groove 162. Accordingly, advantageous effects may be obtained in which the rectilinear movement of the rim 130 is stably supported and a shake of the rim 130 is minimized.

The first gear 140 that is rotated by the power source 142 (e.g., a drive motor) is provided in the spoke 120, and the second gear 150 that is rectilinearly moved by the rotation of the first gear 140 is provided on the rim 130.

More specifically, the first gear 140 is provided in the spoke 120 so as to be rotated by a drive gear 144 coupled to the power source 142. For example, a pinion gear may be used as the first gear 140.

The second gear 150 is provided on the outer circumferential surface of the rim 130 so as to be engaged with the first gear 140. For example, a rack gear may be used as the second gear 150. Any other gear capable of converting the rotation of the first gear 140 to a rectilinear motion may be used as the second gear 150. The present disclosure is not limited or restricted by the type and structure of the second gear 150.

As the second gear 150 is rectilinearly moved by the rotation of the first gear 140, the rim 130 connected to the second gear 150 may rectilinearly move to the uppermost position or the lowermost position relative to the hub 110.

In this example, the uppermost position of the rim 130 relative to the hub 110 may be defined as a position where the rim 130 is located at the top as illustrated in FIG. 5 (a position where the rim 130 can no longer move upward relative to the hub 110), among positions to which the rim 130 is able to move relative to the hub 110 along the up/down direction. The lowermost position of the rim 130 may be defined as a position where the rim 130 is located at the bottom as illustrated in FIG. 6 (a position where the rim 130 can no longer move downward relative to the hub 110), among the positions to which the rim 130 is able to move relative to the hub 110 along the up/down direction.

According to an embodiment of the present disclosure, the steering system 10 for the vehicle includes a processor 22 that controls the position of the rim 130 relative to the hub 110, based on an operating mode of the vehicle.

The processor 22 may be electrically connected with a communication device 24 and storage 26 and may constitute a control device 20 that performs various data processing (computation) and execution in response to an input to a user input device 30.

For example, the processor 22 may be a central processing unit (CPU), or a semiconductor device that processes instructions stored in a memory and/or storage. The memory and the storage may include various types of volatile or non-volatile storage mediums. For example, the memory may include a ROM (Read Only Memory) and a RAM (Random Access Memory).

For reference, operations of a method or an algorithm described in connection with embodiments disclosed herein may be embodied directly in hardware or a software module executed by the processor 22, or in a combination thereof. The software module may reside on a storage medium (that is, the memory and/or the storage) such as a RAM, a flash memory, a ROM, an EPROM, an EEPROM, a register, a hard disk, a removable disk, or a CD-ROM.

For example, the storage medium may be coupled to the processor 22. The processor 22 may read information out of the storage medium and may record information in the storage medium. Alternatively, the storage medium may be integrated with the processor 22. The processor 22 and the storage medium may reside in an application specific integrated circuit (ASIC). The ASIC may reside within a user terminal. In another case, the processor 22 and the storage medium may reside in the user terminal as separate components.

The communication device 24 may be a hardware device implemented with electronic circuitry to transmit and receive signals via wireless or wired connection. In the present disclosure, the communication device 24 may perform in-vehicle communication via CAN communication or LIN communication.

The storage 26 may store drive conditions of the first gear 140 (e.g., the direction of rotation of the first gear 140 and the number of revolutions of the first gear 140) that are calculated by the processor 22. For example, the storage 26 may include at least one type of storage medium among memories of a flash memory type, a hard disk type, a micro type, and a card type (e.g., a secure digital (SD) card or an eXtream digital (XD) card) and memories of a random access memory (RAM) type, a static RAM (SRAM) type, a read-only memory (ROM) type, a programmable ROM (PROM) type, an electrically erasable PROM (EEPROM) type, a magnetic RAM (MRAM) type, a magnetic disk type, and an optical disk type.

Furthermore, a display device 40 on which information about the position of the rim 130 relative to the hub 110 is displayed for each of operating modes of the vehicle may be electrically connected to the control device 20.

For example, the display device 40 may be implemented with a head-up display (HUD), a cluster, an audio video navigation (AVN), or the like, and a display (not illustrated) of the display device 40 may include at least one of a liquid crystal display (LCD), a thin film transistor-LCD (TFT LCD), a light emitting diode (LED) display, an organic LED (OLED) display, an active matrix OLED (AMOLED) display, a flexible display, a bended display, and/or a 3D display. Some of the displays may be implemented with a transparent display of a transparent or photo-transparent type such that the outside can be viewed therethrough. Furthermore, the display may be implemented with a touch screen including a touch panel and may be used as an input device as well as an output device.

More specifically, an operating mode of the vehicle in the present disclosure may be any one of a boarding/alighting mode, an autonomous driving mode, an autonomous driving entertainment mode, and a manual driving mode.

The processor 22 controls the first gear 140 (e.g., controls the direction of rotation and the number of revolutions) to move the rim 130 to the uppermost position or the lowermost position relative to the hub 110 based on any one of the autonomous driving mode, the boarding/alighting mode, the autonomous driving entertainment mode, and the manual driving mode.

According to an embodiment of the present disclosure, the steering system 10 for the vehicle includes a tilt and telescopic device 200 that tilts the hub 110 and telescopically moves the hub 110. The processor 22 controls the tilt and telescopic device 200 based on an operating mode of the vehicle.

The tilt and telescopic device 200 is configured to control a tilt angle (tilt-up or tilt-down) of the hub 110 (or the rim 130) and a forward/backward movement (a forward telescopic movement or a backward telescopic movement) of the hub 110 (or the rim 130).

A common tilt and telescopic means including a controller capable of implementing a tilt angle and a forward/backward movement of the hub 110 may be used as the tilt and telescopic device 200. The present disclosure is not limited or restricted by the type and structure of the tilt and telescopic device 200.

For example, the processor 22 is configured to: move the rim 130 to the uppermost position relative to the hub 110; tilt the hub 110 upward; and telescopically move the hub 110 forward when the boarding/alighting mode of the vehicle is activated.

In this example, a tilt-up movement of the hub 110 is defined as counterclockwise rotation of the hub 110 about the lowermost end of the rim 130 with respect to FIG. 4. A tilt-down movement of the hub 110 is defined as clockwise rotation of the hub 110 about the lowermost end of the rim 130.

Furthermore, a forward telescopic movement of the hub 110 is defined as a rectilinear movement of the hub 110 toward an instrument panel of the vehicle along the axial direction of the steering column 112 with respect to FIG. 4. A backward telescopic movement of the hub 110 is defined as a rectilinear movement of the hub 110 away from the instrument panel of the vehicle along the axial direction of the steering column 112.

In addition, the boarding/alighting mode of the vehicle may be activated when a door lock for locking doors of the vehicle is unlocked or when the ignition of the vehicle is turned off. According to another embodiment of the present disclosure, the boarding/alighting mode of the vehicle may be activated by detecting an input to the user input device 30 or detecting any other state.

The processor 22 may be configured to: move the rim 130 to the uppermost position relative to the hub 110; tilt the hub 110 upward; and telescopically move the hub 110 forward when the autonomous driving mode of the vehicle is activated.

The autonomous driving mode of the vehicle may be activated by an input to the user input device 30. Turning on/off the autonomous driving mode may be included in a user setting menu (USM).

As described above, when the boarding/alighting mode of the vehicle or the autonomous driving mode of the vehicle is activated, the hub 110 is tilted upward and telescopically moved forward. Accordingly, advantageous effects may be obtained in which interference with the steering wheel 100 (e.g., interference with the steering wheel 100 when the driver sits with his/her legs crossed) is minimized, the space for the driver's seat is expanded, and a comfortable riding environment is created.

In another example, the processor 22 may be configured to: move the rim 130 to the lowermost position relative to the hub 110; tilt the hub 110 downward; and telescopically move the hub 110 forward when the autonomous driving entertainment mode of the vehicle is activated.

In this example, the autonomous driving entertainment mode of the vehicle may be defined as a mode in which a display device provided on the instrument panel or the dashboard of the vehicle is used.

The autonomous driving entertainment mode of the vehicle may be activated by an input to the user input device

30. Turning on/off the autonomous driving entertainment mode may be included in the user setting menu (USM).

As described above, when the autonomous driving entertainment mode of the vehicle is activated, the hub 110 is tilted downward and telescopically moved forward. Accordingly, advantageous effects may be obtained in which the display device is minimally hidden by the rim 130 and a comfortable video viewing environment is created.

According to an embodiment of the present disclosure, the steering system 10 for the vehicle includes a seat moving device 400 that moves a seat of the vehicle forward or backward. The processor 22 is configured to move the seat backward when the autonomous driving entertainment mode of the vehicle is activated.

A common seat moving means includes a controller capable of moving the seat forward (the direction toward the steering wheel 100) or backward (the direction away from the steering wheel 100). The common seat moving means may be used as the seat moving device 400. The present disclosure is not limited or restricted by the type and structure of the seat moving device 400.

As described above, when the autonomous driving entertainment mode of the vehicle is activated, the hub 110 is tilted downward and telescopically moved forward, and the seat is moved backward. Accordingly, an advantageous effect may be obtained in which a more comfortable video viewing environment is created.

In another example, the processor 22 may be configured to move the rim 130 to a predetermined initial position relative to the hub 110 when the manual driving mode of the vehicle is activated.

For example, referring to FIG. 1, the rim 130 may be symmetrically located along the up/down direction with respect to the hub 110 (e.g., the hub 110 may be located at the center of the rim 130) in the state in which the rim 130 is moved to the initial position.

Furthermore, the processor 22 may be configured to return a tilted state and a telescopically moved state of the hub 110 and a moved state of the seat to predetermined initial states when the manual driving mode of the vehicle is activated.

Furthermore, the rim 130 may be moved to the initial position even when a safety mode in which the driver is determined to need to manually drive the vehicle depending on detection by a sensor, an error of the system, a road condition, and the like is activated while the vehicle performs autonomous driving (in the autonomous driving mode).

In addition, the processor 22 may be configured to return a tilted state and a telescopically moved state of the hub 110 and a moved state of the seat to the predetermined initial states when the safety mode of the vehicle is activated.

According to an embodiment of the present disclosure, the steering system 10 for the vehicle may include an audio guidance device 300 that provides an audio guidance message for an operating mode of the vehicle before the control of the position of the rim 130 relative to the hub 110.

A common speaker or a sound output device of the vehicle may be used as the audio guidance device 300. The present disclosure is not restricted or limited by the type and structure of the audio guidance device 300.

For example, the audio guidance device 300 may provide the guidance message: "the steering wheel 100 will be moved for the convenience of boarding/alighting" when the boarding/alighting mode of the vehicle is activated. The audio guidance device 300 may provide the guidance message: "the steering wheel 100 will be moved for the convenience of a rest during autonomous driving" when the autonomous driving mode of the vehicle is activated. Furthermore, the audio guidance device 300 may provide the guidance message: "the seat and the steering wheel 100 will be moved for the convenience of watching a video during autonomous driving" when the autonomous driving entertainment mode of the vehicle is activated. The audio guidance device 300 may provide the guidance message: "the steering wheel 100 will be moved to the initial position appropriate for manually driving the vehicle" when the manual driving mode of the vehicle is activated.

Hereinafter, a method for controlling the steering system 10 for the vehicle according to the present disclosure is described.

Figure 7:
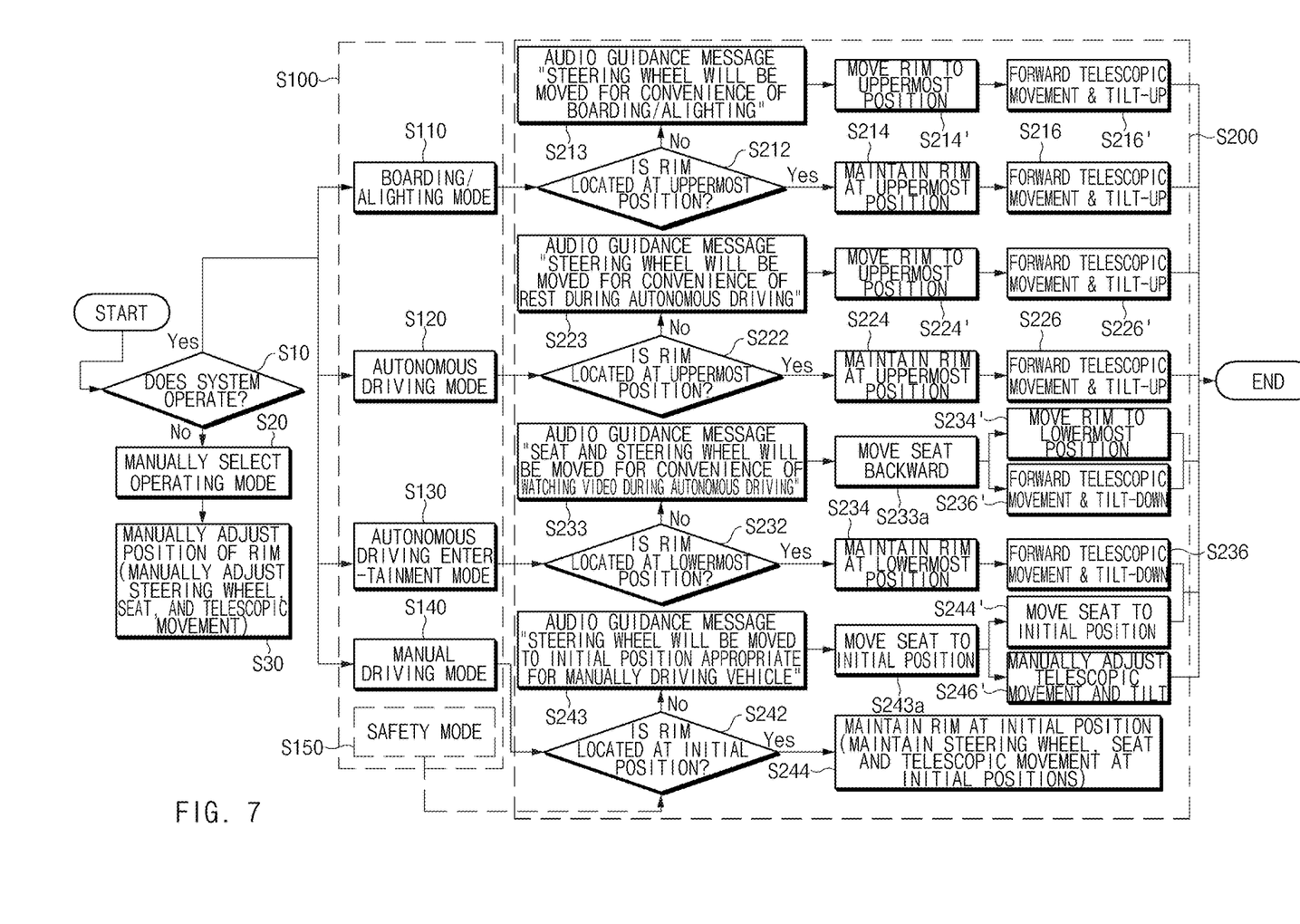
FIG. 7 is a flowchart illustrating a method for controlling the steering system for the vehicle according to an embodiment of the present disclosure.

FIG. 7 is a flowchart illustrating the method for controlling the steering system 10 for the vehicle according to the present disclosure. Components identical or corresponding to the components described above are denoted by identical or corresponding reference numerals, and detailed descriptions thereabout are omitted.

Referring to FIG. 7, the method for controlling the vehicle steering system 10 that includes: the hub 110 connected to the steering column 112 of the vehicle; the spoke 120 connected to the hub 110; the rim 130 disposed around the hub 110 and connected to the spoke 120 so as to be rectilinearly movable; the first gear 140 provided in the spoke 120 and rotated by a power source 142; and the second gear 150 that is provided on the rim 130 so as to be engaged with the first gear 140 and rectilinearly moved by the rotation of the first gear 140 and that moves the rim 130 relative to the spoke 120. The method includes detection step S100 of detecting an operating mode of the vehicle and control step S200 of controlling the position of the rim 130 relative to the hub 100 based on the operating mode of the vehicle.

First, the processor 22 detects whether the steering system 10 operates in response to an input to the user input device 30 (S10).

Next, the processor 22 detects an operating mode of the vehicle, with the steering system 10 in operation (S100).

More specifically, in detection step S100, the processor 22 may detect any one of the boarding/alighting mode, the autonomous driving mode, the autonomous driving entertainment mode, and the manual driving mode of the vehicle.

Then, the processor 22 controls the position of the rim 130 relative to the hub 110 based on the operating mode of the vehicle (S200).

More specifically, in control step S200, the processor 22 controls the first gear 140 to move the rim 130 to the uppermost position or the lowermost position relative to the hub 110 based on any one of the autonomous driving mode, the boarding/alighting mode, the autonomous driving entertainment mode, and the manual driving mode.

In this example, the uppermost position of the rim 130 relative to the hub 110 is defined as a position where the rim 130 is located at the top (a position where the rim 130 can no longer move upward relative to the hub 110), among several positions to which the rim 130 is able to move relative to the hub 110 along the up/down direction (refer to FIG. 5). The lowermost position of the rim 130 is defined as a position where the rim 130 is located at the bottom (a position where the rim 130 can no longer move downward relative to the hub 110) among the positions to which the rim 130 is able to move relative to the hub 110 along the up/down direction (refer to FIG. 6).

Furthermore, according to an embodiment of the present disclosure, the method for controlling the steering system 10 for the vehicle includes moving steps S216, S216', S226, S226', S236, S236', and S246' of tilting the hub 110 and telescopically moving the hub 110 based on the operating mode of the vehicle.

In this example, a tilt-up movement of the hub 110 is defined as counterclockwise rotation of the hub 110 about the lowermost end of the rim 130 with respect to FIG. 4. A tilt-down movement of the hub 110 is defined as a clockwise rotation of the hub 110 about the lowermost end of the rim 130.

Furthermore, a forward telescopic movement of the hub 110 is defined as a rectilinear movement of the hub 110 toward the instrument panel of the vehicle along the axial direction of the steering column 112 with respect to FIG. 4. A backward telescopic movement of the hub 110 is defined as a rectilinear movement of the hub 110 away from the instrument panel of the vehicle along the axial direction of the steering column 112.

For example, when the boarding/alighting mode of the vehicle is activated (S110), the processor 22 determines whether the rim 130 is located at the uppermost position (S212).

When it is determined that the rim 130 is located at the uppermost position in the state in which the boarding/alighting mode of the vehicle is activated, the processor 22 maintains the rim 130 at the uppermost position (S214) and tilts the hub 110 upward and telescopically moves the hub 110 forward (S216).

In contrast, when it is determined that the rim 130 is located at a position rather than the uppermost position, the processor 22 moves the rim 130 to the uppermost position relative to the hub 110 (S214') and tilts the hub 110 upward and telescopically moves the hub 110 forward (S216').

Furthermore, according to an embodiment of the present disclosure, the method for controlling the steering system 10 for the vehicle may include audio guidance steps S213, S223, S233, and S243 of providing audio guidance messages for the operating modes of the vehicle before the control of the position of the rim 130 relative to the hub 110.

For example, when the rim 130 is determined to need to be moved (the rim 130 is determined to be located at a position rather than the uppermost position) in the state in which the boarding/alighting mode of the vehicle is activated, the guidance message: "the steering wheel 100 will be moved for the convenience of boarding/alighting" may be provided in audio guidance step S213.

In another example, when the autonomous driving mode of the vehicle is activated (S120), the processor 22 determines whether the rim 130 is located at the uppermost position (S222).

When it is determined that the rim 130 is located at the uppermost position in the state in which the autonomous driving mode of the vehicle is activated, the processor 22 maintains the rim 130 at the uppermost position (S224) and tilts the hub 110 upward and telescopically moves the hub 110 forward (S226).

In contrast, when it is determined that the rim 130 is located at a position rather than the uppermost position, the processor 22 moves the rim 130 to the uppermost position relative to the hub 110 (S224') and tilts the hub 110 upward and telescopically moves the hub 110 forward (S226').

Furthermore, when it is determined that the rim 130 needs to be moved (the rim 130 is determined to be located at a position rather than the uppermost position) in the state in which the autonomous driving mode of the vehicle is activated, the guidance message: "the steering wheel 100 will be moved for the convenience of a rest during autonomous driving" may be provided in audio guidance step S223.

In another example, when the autonomous driving entertainment mode of the vehicle is activated (S130), the processor 22 determines whether the rim 130 is located at the lowermost position (S232).

When it is determined that the rim 130 is located at the lowermost position in the state in which the autonomous driving entertainment mode of the vehicle is activated, the processor 22 maintains the rim 130 at the lowermost position (S234) and tilts the hub 110 downward and telescopically moves the hub 110 forward (S236).

In contrast, when it is determined that the rim 130 is located at a position rather than the lowermost position, the processor 22 moves the rim 130 to the lowermost position relative to the hub 110 (S234') and tilts the hub 110 downward and telescopically moves the hub 110 forward (S236').

Furthermore, when it is determined that the rim 130 is located at a position rather than the lowermost position in the state in which the autonomous driving entertainment mode of the vehicle is activated, the processor 22 moves the seat of the vehicle backward (S233a) while tilting the hub 110 downward and telescopically moving the hub 110 forward.

When the rim 130 is determined to need to be moved (the rim 130 is determined to be located at a position rather than the lowermost position) in the state in which the autonomous driving entertainment mode of the vehicle is activated, the guidance message: "the seat and the steering wheel 100 will be moved for the convenience of watching a video during autonomous driving" may be provided in audio guidance step S233.

When the manual driving mode of the vehicle is activated (S140), the processor 22 determines whether the rim 130 is located at a preset initial position (S242).

When it is determined that the rim 130 is located at the initial position in the state in which the manual driving mode of the vehicle is activated, the processor 22 maintains the rim 130 at the initial position (S244). At this time, the tilted state and the telescopically moved state of the hub 110 and the moved state of the seat are maintained in predetermined initial positions.

In contrast, when it is determined that the rim 130 is located at a position rather than the initial position, a user manually moves the rim 130 to the initial position (S244') and tilts and telescopically moves the hub 110 to the initial positions (S246').

Furthermore, when it is determined that the rim 130 is located at a position rather than the initial position in the state in which the manual driving mode of the vehicle is activated, the user manually moves the seat of the vehicle to a predetermined initial position (S243a) while moving the rim 130 to the initial position (S244').

When the rim 130 is determined to need to be moved in the state in which the manual driving mode of the vehicle is activated, the guidance message: "the steering wheel 100 will be moved to the initial position appropriate for manually driving the vehicle" may be provided in audio guidance step S243.

Even in the case where the safety mode of the vehicle in which the driver is determined to need to manually drive the vehicle depending on detection by a sensor, an error of the system, a road condition, and the like is activated (S150), the rim 130 is maintained at the initial position (S244) when it is determined that the rim 130 is located at the initial position.

In contrast, when it is determined that the rim 130 is located at a position rather than the initial position in the state in which the safety mode of the vehicle is activated (S150), the user manually moves the rim 130 to the initial position (S244') and tilts and telescopically moves the hub 110 to the initial positions (S246').

In the state in which the steering system 10 does not operate, the user may manually select an operating mode of the vehicle (S20) and may manually move the rim 130 (S30). At this time, a tilt movement of the steering wheel 100, a forward/backward movement of the seat, and a telescopic movement of the steering wheel 100 may also be performed by the user's manual operation.

As described above, according to the present disclosure, an advantageous effect of improving convenience and safety may be obtained.

In particular, according to the present disclosure, an advantageous effect may be obtained in which the posture of the rim is optimized depending on an operating mode of the vehicle.

In addition, according to the present disclosure, advantageous effects may be obtained in which a comfortable riding environment is created and driver satisfaction is improved.

Hereinabove, although the present disclosure has been described with reference to various embodiments and the accompanying drawings, the present disclosure is not limited thereto, but may be variously modified and altered by those of ordinary skill in the art to which the present disclosure pertains without departing from the spirit and scope of the present disclosure claimed in the following claims.

What is claimed is:

1. A steering system for a vehicle, the steering system comprising:
   a hub connected to a steering column of the vehicle;
   a spoke connected to the hub;
   a rim disposed around the hub and having a left end portion and a right end portion formed in the form of a straight line and which are connected to the spoke so as to be rectilinearly movable along a direction in which the left end portion and the right end portion extend;
   a first gear provided in the spoke and rotated by a power source; and
   a second gear provided on the rim so as to be engaged with the first gear and rectilinearly moved by the rotation of the first gear, the second gear being configured to move the rim relative to the spoke.

2. The steering system of claim 1, further comprising:
   a guide member connected to the spoke, wherein the rim is received in the guide member so as to be rectilinearly movable.

3. The steering system of claim 2, wherein a guide protrusion is formed on the rim, and
   wherein the guide member has a guide groove formed therein, wherein the guide protrusion is received in the guide groove so as to be rectilinearly movable.

4. The steering system of claim 1, further comprising:
   a processor configured to control a position of the rim relative to the hub, based on an operating mode of the vehicle.

5. The steering system of claim 4, wherein the operating mode of the vehicle is any one of a boarding/alighting mode, an autonomous driving mode, an autonomous driving entertainment mode, and a manual driving mode, and
   wherein the processor controls the first gear to move the rim to the uppermost position or the lowermost position relative to the hub, based on any one of the autonomous driving mode, the boarding/alighting mode, the autonomous driving entertainment mode, and the manual driving mode.

6. The steering system of claim 5, further comprising:
   a tilt and telescopic device configured to tilt the hub and telescopically move the hub,
   wherein the processor controls the tilt and telescopic device based on the operating mode of the vehicle.

7. The steering system of claim 6, wherein the processor moves the rim to the uppermost position relative to the hub, tilts the hub upward, and telescopically moves the hub forward, when the boarding/alighting mode of the vehicle or the autonomous driving mode of the vehicle is activated.

8. The steering system of claim 6, wherein the processor moves the rim to the lowermost position relative to the hub, tilts the hub downward, and telescopically moves the hub forward, when the autonomous driving entertainment mode of the vehicle is activated.

9. The steering system of claim 8, further comprising:
   a seat moving device configured to move a seat of the vehicle forward or backward,
   wherein the processor moves the seat backward, when the autonomous driving entertainment mode of the vehicle is activated.

10. The steering system of claim 6, wherein the processor moves the rim to a predetermined initial position relative to the hub, when the manual driving mode of the vehicle is activated.

11. The steering system of claim 5, further comprising:
    an audio guidance device configured to provide an audio guidance message for the operating mode of the vehicle before the control of the position of the rim relative to the hub.

12. A method for controlling a steering system for a vehicle, wherein the steering system includes a hub connected to a steering column of the vehicle, a spoke connected to the hub, a rim disposed around the hub and having a left end portion and a right end portion formed in the form of a straight line and which are connected to the spoke so as to be rectilinearly movable along a direction in which the left end portion and right end portion extend, a first gear provided in the spoke and rotated by a power source, and a second gear provided on the rim so as to be engaged with the first gear and rectilinearly moved by the rotation of the first gear, the second gear being configured to move the rim relative to the spoke, the method comprising:
    a detection step of detecting an operating mode of the vehicle; and
    a control step of controlling a position of the rim relative to the hub, based on the operating mode of the vehicle.

13. The method of claim 12, wherein in the detection step, any one of an autonomous driving mode, a boarding/alighting mode, an autonomous driving entertainment mode, and a manual driving mode is detected, and
    wherein in the control step, the first gear is controlled to move the rim to the uppermost position or the lowermost position relative to the hub, based on any one of the autonomous driving mode, the boarding/alighting mode, the autonomous driving entertainment mode, and the manual driving mode.

14. The method of claim 13, further comprising:
    a moving step of tilting the hub and telescopically moving the hub, based on the operating mode of the vehicle.

15. The method of claim 14, wherein in the control step, the rim is moved to the uppermost position relative to the hub, and the hub is tilted upward and telescopically moved forward, when the autonomous driving mode of the vehicle or the boarding/alighting mode of the vehicle is activated.

16. The method of claim 14, wherein in the control step, the rim is moved to the lowermost position relative to the hub, and the hub is tilted downward and telescopically moved forward, when the autonomous driving entertainment mode of the vehicle is activated.

17. The method of claim 16, wherein in the control step, a seat of the vehicle is moved backward, when the autonomous driving entertainment mode of the vehicle is activated.

18. The method of claim 14, wherein in the control step, the rim is moved to a predetermined initial position relative to the hub, when the manual driving mode of the vehicle is activated.

19. The method of claim 13, further comprising:
   an audio guidance step of providing an audio guidance message for the operating mode of the vehicle before the control of the position of the rim relative to the hub.

\* \* \* \* \*